UNITED STATES PATENT OFFICE.

JONAS W. AYLSWORTH, OF EAST ORANGE, NEW JERSEY, ASSIGNOR TO CONDENSITE COMPANY OF AMERICA, OF GLEN RIDGE, NEW JERSEY, A CORPORATION OF NEW JERSEY.

PHENOLIC CONDENSATION PRODUCT AND METHOD OF FORMING SAME.

1,111,285. Specification of Letters Patent. Patented Sept. 22, 1914.

No Drawing. Original application filed May 14, 1909, Serial No. 496,060. Divided and this application filed June 2, 1911. Serial No. 630,894.

*To all whom it may concern:*

Be it known that I, JONAS W. AYLSWORTH, a citizen of the United States, and a resident of East Orange, in the county of Essex and State of New Jersey, have invented certain new and useful Improvements in Phenolic Condensation Products and Methods of Forming Same, of which the following is a description.

This application is a division of my application Ser. No. 496,060, filed May 14, 1909, entitled Composition and process of manufacturing the same. The invention of the original application relates to and describes compositions for molding various articles, such as may be made from celluloid, hard rubber and kindred substances, and also to the production of synthetic resins. The composition first mentioned may likewise be used for the formation of insulators, phonograph records, and in many other connections.

My invention as described in my parent application referred to, comprises more specifically, first, the formation of a hard fusible phenol resin from phenol or cresol by condensation with formaldehyde, which is the synthetic resin above referred to, and secondly, the formation of an ultimate infusible condensation product of a phenol and formaldehyde or equivalents of these substances, this infusible product being very hard and chemically inert. This infusible product may have what I term a "solid solvent element" or "plasticity ingredient" incorporated therewith, or not, according to different phases of my invention. This present application is concerned with the products containing such an element, and processes for making the same. Such products, while infusible are sufficiently plastic, on application of heat as hereinafter described, to be shaped or pressed into form at suitable temperatures. This infusible, "thermo-plastic" product, as I may term it, is preferably formed from the phenol resin referred to, but a product having many of the advantages of this preferred product may be formed by treating various of the "shellac substitutes" now known, in a manner to be described. The product may be formed directly in the molds in the desired final shape, or it may be cast into solid slabs, bars, cylinders, or the like, and subsequently heated and pressed into the desired shape. The degree of plasticity will vary in accordance with various of the ingredients of the mass.

As stated, this application will describe and claim a composition comprising a hard infusible phenolic condensation product in solid solution or combination with a solid solvent or plasticity ingredient, either with or without the addition of an ingredient of a class which I term water-combining elements. The solid solvent or plasticity element may, in certain cases, also perform the water-combining function without the addition of a separate water-combining element, but such a composition is not claimed herein, being claimed in my Patent No. 1,020,594, granted March 19, 1912.

The object of my invention as claimed in this application, is accordingly the production of substances of the character referred to, in which an ultimate infusible phenolic condensation product is in solid solution or combination with substances of the character referred to, the invention including the compositions themselves and also a method for producing the same.

As described in my parent application above referred to, I preferably first form the hard fusible phenol resin from phenol or cresol or equivalents, by condensation, preferably with formaldehyde, as above stated. This resin may be produced in several ways, as will be hereinafter described. In the formation therefrom, of the ultimate condensation product, or in the formation from any suitable phenol resin of a final condensation product embodying the advantages of my invention, formaldehyde, preferably in polymerized form, is incorporated with the phenol resin, in the proportion of about 5 to 7½ per cent. of the weight of the resin, and dissolved therein. The solid polymerized forms of formaldehyde are preferred because they are the only anhydrous forms in which formaldehyde occurs. Phenol resin is non-water-soluble, and consequently will not mix with a water solution of formaldehyde, but is a solvent when in melted or dissolved condition for anhydrous formaldehyde. If formaldehyde solution is used instead of polymerized formaldehyde, heating to reaction temperature drives off the water and a considerable part of the formaldehyde from the solution, and converts the remainder of the formaldehyde into the polymerized form, which then dissolves in and reacts with the resin. With this method it is more difficult to obtain the correct reacting proportion of the formaldehyde component. Also, in the product claimed herein, a solvent of the final product, which may also act as a thinning or anti-viscosity agent is incorporated therewith, and, if desired, a small percentage of a water-combining element, such as an anhydrid of an organic acid, more fully described hereinafter.

Having obtained the above mixture the same may be cast in suitable molds for the formation of the desired articles or for the formation of rods, sheets, tubes, or slabs, or the like, from which the desired articles may subsequently be made by heat and pressure, or by forming by tools. The molds and their contents are heated sufficiently to transform the product into a hard, infusible, chemically inert substance, the temperature to which the same is heated in practice varying between 260° and 400° Fahrenheit, depending on the treatment of the phenol resin before mixing, the character of the water-combining element and the product solvent and the character of the molded article. The heating may be accomplished by casting in suitable steam-jacketed molds, or by placing the molds and contents in suitable ovens for a time sufficient to allow the mixture to interact and harden. This time may vary within wide limits, depending on the thickness of the article and the character of the mass. Thin sheets and small articles may be hardened in a few minutes, while larger masses and objects of special character may require gradual heating to the lowest temperature necessary for the reaction to take place and continued heating at such temperature, or at an elevated temperature, for several hours. The ultimate product so formed will not melt at any temperature below that of its decomposition, but will soften and become sufficiently plastic at from 240° to 300° F., to be further shaped by pressing in suitable dies or molds. The degree of plasticity may be controlled to a certain extent by the nature of the solvent ingredient and proportions thereof, and by varying the proportions of the polymerized formaldehyde, added to the phenol resin. In case the plasticity is controlled by varying the proportion of the polymerized formaldehyde, the phenol resin itself acts as a solvent for the ultimate product to an extent sufficient to render it plastic when heated, in this case the proportions of formaldehyde being less than in products in which plasticity is controlled by added solvent elements.

As stated, the phenol resin or fusible condensation product may be formed in several different ways. With the first of these methods, the phenol or cresol is heated in an autoclave to a temperature of from 260° to 340° F., and maintained at such temperature. I prefer to use a temperature between 280° and 300° F., but a higher temperature is necessary under some circumstances. The temperature to which the phenol is heated is determined by the nature of the phenol used, and the time in which it is desired to form the resin, which is correspondingly shorter as a higher temperature is used. The melting point of the product formed is found by experience to vary with the use of different temperatures.

Formaldehyde gas, which may be formed in suitable generators, is forced by suitable pumps into the bottom of the autoclave where it is distributed by means of a finely perforated coil into a multitude of bubbles, which pass upward through the phenol and are absorbed therein and combined therewith. A pressure in slight excess of the vapor tension of the contents of the autoclave is maintained in the autoclave by means of feeding compressed formaldehyde gas therein as rapidly as it combines with the phenol. At a pressure of 50 to 100 pounds per square inch, good results may be obtained. The reaction may be carried on more rapidly at higher temperatures than those which I have above described as preferable and convenient. The pressure used is about the same as that of water vapor at the temperature used.

The contents of the vessel are preferably kept in rapid circulation by a propeller or other convenient means. The reaction proceeds rapidly and provision should be made for carrying off the excess heat above the proper reaction temperature, which is the temperature to which the phenol was initially heated. Such a heat in excess of that necessary to maintain the reaction temperature will be generated by the reaction itself. The supply of formaldehyde is continued until a sample withdrawn for test, shows only a very small percentage of free or unchanged phenol. The supply of gas is then stopped and a vent in the autoclave is opened for the escape of steam, which is regulated by a suitable valve. The contents of the chamber are then heated to complete dehydration, which requires about 400° F. of heat. The contents are then cooled to about 240° F. and cast in ingots for subsequent use, or passed into suitable mixing vessels for immediate use.

Other methods of making the phenol resin are described in my parent application referred to. In one of these methods, I may use a 35% solution of formaldehyde in the proportion of 1000 parts of phenol to 750 parts of formaldehyde by weight, and heat the mass to a temperature of from 300 degrees to 320 degrees F. under its own pressure, without any agent. If a 40% solution of formaldehyde is used, the proportions should be about 650 parts of formaldehyde to 1000 parts of phenol. In the above proportions, formaldehyde solutions are given as volume percentages. The weight percentage of the formaldehyde in the solution is approximately 5% less. The proportions of formaldehyde solution given in the formulas are slightly more than the required amount to allow for losses during the process. In this method as in Method No. 1 above described, care must be taken to avoid the presence of any impurity which will act as an accelerator or catalytic agent, otherwise difficulty fusible and very viscid products will result. For instance, if the operation is carried out in an iron vessel, care must be taken to have the iron well enameled or lined with a metal which will not modify the product. Iron and lead so modify the product as to render the latter unfit. Tin or tinned copper or nickel, are metals which can be used to line the vessel without modifying the product. If crude phenol or cresol are used, they should first be refined by distillation to eliminate basic metallic impurities as well as mineral acids.

The phenol resin obtained by any of the methods described after complete dehydration and removal of excess phenol is a hard resin, very similar in texture to copal and kauri gum. It is soluble in all proportions in acetone, amyl, ethyl, methyl, and butyl alcohol, amyl, ethyl and methyl acetate, acetic acid, acetylene tetrachlorid, and mono-nitro-benzene, (oil of mirbane), from which it remains unchanged after evaporation of the solvents. It is fusible and practically unchanged when heated to 420° F. It melts at about 220° F., but has no sharp melting point passing through various degrees of viscosity, until at 250° F. it may readily be poured and at 350° F. it becomes quite thinly fluid. It acts as a weak acid toward bases with which it combines. It is soluble in shellac, resin and similar substances when fused therewith. This resin will not form the hard infusible condensation product described by Smith, Story, Baekeland and others, (see English Patents 16,247 of 1899, to Smith, 8875 of 1905, to Story, and U. S. Patent 942,699, to Baekeland, and also U. S. Patent No. 735,278 to Luft, and article by W. Kleeberg, in the German publication "Annalen der Chemie" (Liebig, volume 263, page 283, 1891), when heated with basic or acid condensing agents, or alone, at any temperature. When mixed with formaldehyde, paraformaldehyde or trioxymethylene, and heated, it combines therewith and forms a hard infusible mass, which, if not admixed with other bodies, remains transparent and chemically inert. It will not, however, form such hard infusible mass when mixed with aldehydes in general, other than those mentioned, and if the percentage of formaldehyde or its polymers exceed about 7½ per cent., the excess escapes as bubbles in the mass and renders the latter useless for some purposes.

In the formation of the ultimate condensation product, the phenol resin is mixed as stated, with formaldehyde which is preferably polymerized. The substances of this character which I consider best adapted for the purpose are trioxymethylene and dioxymethylene, in an amount which is sufficient to combine with nearly all the resin, so that there may be no excess of formaldehyde or polymer thereof to cause bubbling of the mass during the hardening operation. Such an amount may vary between 5 and 7½ per cent. of the weight of phenol resin used. Formaldehyde, not polymerized, may be used in place of the polymerized substance, in which case the polymerized formaldehyde is formed by evaporation during the process. It is usually impracticable to make the phenol resin entirely free from uncombined phenol, and the small variable percentage of phenol makes it necessary in the formation of the mixture for the ultimate product to vary the percentage of dioxymethylene, trioxymethylene, or paraformaldehyde in the mixture with the resin, in accordance with the percentages of free phenol, ascertained by test. The phenol combines with a much greater proportion of polymerized formaldehyde than does the phenol resin. By varying the percentage of the polymerized formaldehyde as indicated, the free phenol in the phenol resin may all be taken into combination. The product thus obtained after heating the phenol resin and the other elements mentioned in proper proportions to a temperature of from 280° to 400° F. or higher, is somewhat similar to the final condensation product described by Baekeland and others, but differs in four important particulars, as follows:

First, the ingredients of the ultimate product may be baked during the hardening operation by heating, as hereinbefore explained, to a temperature of from 260° to 350° F. without becoming porous from gas bubbles other than such as may be entrapped by the mass when cast, thus rendering it unnecessary to heat or perform the hardening operation under a counteracting pressure in closed vessels.

Secondly, the ultimate condensation product so formed, when the same also includes a plasticity or solid solvent ingredient more fully described hereinafter softens sufficiently to allow further shaping, as stated, at a temperature between 240° and 300° F. while at the same time it is infusible at any temperature lower than that of its decomposition.

Thirdly, my product is tougher and less brittle in texture than the substances previously known in the art, as referred to above, because no basic accelerating or catalytic agent is necessary or even desirable. This absence of a condensing agent or other impurity permits the formation of an ultimate product which is almost colorless, when desired.

Fourth, the ultimate product here described and claimed may be made of exact and definite ultimate composition under perfect control, whereas, by the known methods in vogue, an intermediate and final product are made which are not under such control, resulting in excessive losses. Economy in manufacture of the product is also enhanced.

The ultimate product, as claimed herein is further distinguished from the similar substances heretofore known by the incorporation therewith of a water-combining element, and a final product solvent element in varying percentages.

The water-combining element takes care of traces of water which may be expelled during the baking operation. This results in a clearer and more transparent product, although I do not regard the inclusion of this element as absolutely essential. Examples of this class are benzoic anhydrid, phthalic anhydrid, and any such organic anhydrids as are soluble in and miscible with the mass, and are not decomposed at temperatures used. The final product solvent element contributes greater toughness to the product by counteracting the brittle nature of the ultimate product and renders the final mass plastic when heated, thus relieving internal stresses during the baking and hardening operations and subsequent cooling. By final product solvents, I include only substances which will dissolve the ultimate condensation product or combine therewith at the baking temperature, render it plastic at such temperature, and remain as a part of the product in the condition of solid solution. Examples of substances of this class are naphthalene and some of its derivatives, such as nitro and chloro derivatives, especially the mono-nitro and di-notro naphthalenes, di-nitro benzene, preferably the meta variety, acetanilid, ricinoleic acid, and ricinelaidic acid, and their anhydrids; benzoic acid and anhydrid, and di-phenylamin. Naphthalene which is noted among the final product solvents is a substance which tends to volatilize slowly at ordinary temperatures when alone. It does not, however, volatilize perceptibly at ordinary temperatures when in solid solution with the ultimate condensation product, and within the proportions given in some of the following examples. The naphthalene derivatives mentioned when in solid solution with the ultimate condensation product do not volatilize either at room temperatures or at 212° F. In certain cases anhydrids of organic acids may be added which will perform both the water absorbing function and the solvent or plasticity function. Such substances are benzoic anhydrid and ricinelaidic anhydrid.

All of the plasticity or solid solvent ingredients named are substantially non-volatile at room temperatures except naphthalene, which, as noted above, volatilizes slowly when alone. These substances also are all very slight solubility in water and most of them are practically non-water soluble at room temperatures. For example, the nitro- and chloro-napthalene derivatives mentioned above, the di-nitro-benzene (meta), and ricinoleic and ricinelaidic acids are apparently insoluble in water at 25° C. The practical non-water solubility of the solvent or plasticity ingredients referred to is a valuable feature, because such ingredients cannot be removed from the mass to any appreciable extent, by water, even when the mass is in comminuted form, and furthermore masses made including such ingredients are not so susceptible to the influence of moisture in the atmosphere as are compositions containing ingredients such as glycerin, which are soluble to a very great extent in water. Condensation products containing glycerin, for example, constantly attract moisture from the atmosphere because of the hygroscopic nature of the glycerin. The plasticity ingredients mentioned as desirable by me also all have melting points substantially lower than their boiling points which is an important property, since thereby all the ingredients of the composition can be mixed in fluid condition, and the plasticity ingredient used will not volatilize away during the mixing or hardening reaction.

In this application I shall limit myself to those solid solvent or plasticity ingredients which are practically non-volatile and non-water-soluble at room temperatures. Naphthalene will not be claimed herein, being claimed in my application Serial No. 694,644, filed May 2, 1912, and phthalic acid or anhydrid also will not be included in the claims of this application, as the solid solvent element, being specifically mentioned in claims in my Patent No. 1,020,594, referred to above.

For special uses, I may also advantageously add small percentages of acid catalytic or condensing agents when mixing the phenol resin and the other ingredients for the purpose of causing the final reaction to ensue more rapidly and at a lower temperature. Effective agents for this purpose are small amounts ($\frac{1}{10}$ to 2 per cent.) of the hydrochlorids of a variety of organic radicals, such as anilin hydrochlorid, hydroxylamin hydrochlorid, and pinene-hydrochlorid. By the use of such agents the hardening reaction can be made to take place at temperatures much below 250° F.; without such agents the reaction proceeds much more slowly and at higher temperatures. Such a composition is particularly well suited for hard varnish and lacquers by mixing and dissolving in alcohol, or equivalent volatile solvents, and when dried heating moderately in a steam oven. Suitable chemically inert pigments and fillers may be incorporated with the mass when desired.

The mass of the ultimate condensation product is normally of amber color and transparent. It may be made practically colorless if special precautions are taken to exclude color-giving impurities from the phenol and to exclude oxygen during subsequent heat treatment. It may also, if desired, be given any desired color by the addition of suitable pigments. Chemically inert cheaper substances in powdered or fibrous form may be incorporated with the mass before baking in widely varying per cents, when desired.

Preferred formulæ for masses which are to be hardened in molds without subsequent pressing operations are as follows:—

*For light colored and transparent products.*

|     |                           | Parts by weight. |
| --- | ------------------------- | ---------------- |
| (1.) | Phenol resin              | 100              |
|     | Polymerized formaldehyde  | 5 to 7           |
|     | Benzoic anhydrid          | 5 to 10          |
| (2.) | Phenol resin              | 100              |
|     | Naphthalene               | 5 to 10          |
|     | Polymerized formaldehyde  | 5 to 7           |
| (3.) | Phenol resin              | 100              |
|     | Benzoic anhydrid          | 2 to 4           |
|     | Naphthalene               | 5 to 10          |
|     | Try-oxymethylene          | 5 to 8           |

*For wine colored products.*

|     |                     | Parts by weight. |
| --- | ------------------- | ---------------- |
| (4.) | Phenol resin        | 100              |
|     | Meta di-nitro benzene | 5 to 10        |
|     | Paraformaldehyde    | 5 to 7           |

*For non-melting plastic compositions.*

|     |                         | Parts by weight. |
| --- | ----------------------- | ---------------- |
| (5.) | Phenol resin            | 100              |
|     | Naphthalene             | 10 to 40         |
|     | Paraformaldehyde        | 5 to 10          |
| (6.) | Phenol resin            | 100              |
|     | Naphthalene             | 10 to 20         |
|     | Benzoic anhydrid        | 1 to 5           |
|     | Paraformaldehyde        | 5 to 10          |
| (7.) | Phenol resin            | 100              |
|     | Meta di-nitro benzene   | 10 to 50         |
|     | Paraformaldehyde        | 5 to 7           |
| (8.) | Phenol resin            | 100              |
|     | Di-nitro benzene        | 10 to 40         |
|     | Benzoic anhydrid        | 1 to 5           |
|     | Paraformaldehyde        | 5 to 8           |
| (9.) | Phenol resin            | 100              |
|     | Acetanilid              | 7 to 30          |
|     | Paraformaldehyde        | 6 to 8           |
| (10.) | Phenol resin           | 100              |
|     | Tetra chloro naphthalene | 10 to 25       |
|     | Benzoic anhydrid        | 1 to 5           |
|     | Paraformaldehyde        | 5 to 8           |
| (11.) | Phenol resin           | 100              |
|     | Mono-nitro naphthalene  | 7 to 30          |
|     | Paraformaldehyde        | 6 to 8           |
|     | Benzoic anhydrid        | 1 to 5           |

The specific gravities and other qualities of various of these compositions which are given merely as examples, were found to be as follows:—

|                           | Parts by weight. |                                           |
| ------------------------- | ---------------- | ----------------------------------------- |
| Phenol resin              | 100              | Specific gravity 1.257 at 72° F. Color, light amber, transparent. |
| Benzoic anhydrid          | 15               |                                           |
| Paraformaldehyde          | 9                |                                           |
| Phenol resin              | 100              | Specific gravity 1.248. Color, light amber, transparent. |
| Paraformaldehyde          | 6                |                                           |
| Phenol resin              | 100              | Specific gravity 1.246. Color, light amber, orange tint, transparent. |
| Phenylacetanild (acetanilid) | 13            |                                           |
| Paraformaldehyde          | 8                |                                           |
| Phenol resin              | 100              | Specific gravity 1.324. Opalescent amber color. |
| Tetra-chloro naphthalene  | 20               |                                           |
| Paraformaldehyde          | 8                |                                           |
| Phenol resin              | 100              | Specific gravity 1.317. Deep red wine color, transparent and clear. |
| Di-nitro benzene (meta)   | 40               |                                           |
| Benzoic anhydrid          | 2                |                                           |
| Paraformaldehyde          | 6                |                                           |

The specific gravity of the phenol resin used was found to be 1.240. This substance is transparent and varies in tint from colorless to a dark coffee shade.

In all of the formulæ given above for the ultimate condensation product, the ingredients are mixed and freed from air bubbles by standing in molten condition or by vacuum treatment or by centrifugal treatment at temperatures below 250° F. or freed from air bubbles in any other suitable manner. The mass is then poured into molds and is preferably heated to a temperature of from 260° F. to 270° F. at which temperature it is maintained for a sufficient time to render the mass infusible, and subsequently is heated for a short time to a temperature of 300° to 350° F. The ingredients may also be heated to from 320° to 350° F. under counteracting pressure, as is done in the art of vulcanizing rubber. When no counteracting pressure is used, from one-half to four hours is required before the final temperature may be reached, this time varying with the thickness of the object molded. The plastic compositions indicated in the formulæ 5 to 11 become sufficiently plastic to mold at from 240° to 300° F.

By my invention a composition is formed which is infusible and hard, but is thermoplastic, is chemically inert, and is insoluble in water and in the following solvents, alcohol, (ethyl, methyl, amyl or butylic), ether, chloroform, carbon bi-sulfid, carbon tetrachlorid, acetylene tetrachlorid, acetone, benzone, camphor oil, turpentine, melted waxes, petroleum, and mineral and vegetable oils.

The "shellac substitutes" previously referred to are substances well known as a class, being synthetic resins, more or less fusible and soluble, which are intended to be used as substitutes for natural resin, colophony, etc. They are usually formed by the condensation of a phenol and formaldehyde which are incorporated together in different proportions in different products. The "phenol resin" made and described by me belongs to this class, but has the special characteristics described which render it especially useful in the preparation of my ultimate, infusible product.

The phenol resin described is, as I have stated, completely anhydrous when heated to about 400° F. for complete dehydration. When so heated all the water, both free and combined, is driven off from the product. The ultimate fusible product formed by the reaction between such an anhydrous phenol resin and an added amount of anhydrous formaldehyde or its polymers, as described and claimed herein, is also anhydrous, as stated, if the small amount of water evolved by the reaction between the resin and the added formaldehyde is removed or is permanently fixed by combination with a water-combining element, such as I have described. That is, in the ultimate infusible product, there may be no water, either free or combined, as in the case of the phenol resin, if the water evolved by the reaction between the added formaldehyde and the resin is all removed by proper heating which may be done when the product is in thin sheets or small pieces. If however, this water is not all removed by heating, and a water-combining ingredient is present in the mass, as stated, the water evolved is combined with the water-combining element, and is permanently fixed to form a harmless ingredient in the mass. Thus, for example, if phthalic or benzoic enhydrid is used as the water-combining element, as stated, the water combines with the same to form the corresponding acid, as stated.

The products described and claimed, it should be noted, do not contain hydrochloric acid or other hydro-halogen acid, as is the case when an organic acid chlorid, such as benzoyl chlorid, is used as an accelerating agent in a process for forming a phenolic condensation product, as has been proposed. In this latter case any conversion of the chlorid into benzoic acid by reaction with water in the mass, which may occur, is accompanied by the formation of hydrochloric acid, which is harmful for many purposes, especially when the product is to be used as an insulator.

The term "fusible" appearing in the claims as qualifying a product such as my phenol resin, denotes a product which melts and becomes liquid, when sufficiently heated, under atmospheric pressure. The term infusible in the claims of this application, as qualifying my ultimate product, denotes a substance which does not flow or become liquid, when heated to any temperature, under atmospheric pressure. When an ultimate product solvent element is added, or an excess of phenol resin is used as a solvent for the ultimate product, as stated, the mass becomes sufficiently plastic to be readily pressed or molded to shape, but does not fuse.

The word "phenol" as employed in the claims is intended to include the equivalents of phenol for the purpose of this invention, and the word "formaldehyde" is intended to include the polymers and other recognized equivalents of formaldehyde.

Having now described my invention what I claim as new and desire to protect by Letters Patent is:

1. As a new composition of matter, a solid solution of a phenolic ultimate infusible condensation product and a substance which is practically non-water soluble and non-volatile at room temperatures and which dissolves in such product at an elevated temperature and renders the mass plastic at such temperature, said composition being free from any hydro-halogen acid, substantially as described.

2. As a new composition of matter, a solid body comprising a resinized phenol ultimate reaction product containing a substance which dissolves in such product at an elevated temperature and renders the body plastic at such temperature, the said body being free from any hydro-hologen acid, and infusible and insoluble in alcohol or water, and the said substance being one which is practically non-volatile at room temperatures, whose melting point is substantially lower than its boiling point, and being of such a character and proportion, and so united within said product, as to be substantially incapable of removal from masses of appreciable thickness or size thereof, or by washing the body in comminuted form with water, substantially as described.

3. As a new composition of matter, a solid solution of a phenol formaldehyde ultimate infusible, insoluble condensation product and both water-combining and final product solvent elements, the said composition being free from hydrochloric and other hydro-halogen acids, substantially as described.

4. As a new composition of matter, a solid body, infusible but plastic at a temperature of 350° F., which body is free from any hydro-halogen acid, and comprises a resinized phenol reaction product associated with a stable, non-volatile, non-water-soluble aromatic compound, substantially as described.

5. As a new composition of matter, a solid solution of an ultimate infusible phenolic condensation product and a non-volatile nitronaphthalene derivative, substantially as described.

6. The process of forming a hard infusible product consisting in incorporating with a fusible phenol resin formaldehyde of a quantity just sufficient to combine with substantially all of the same, together with a final product solvent element which will dissolve therein on application of heat, and heating the mass sufficiently to cause the reaction to ensue and the mass to be transformed into a hard infusible chemically inert product containing the product solvent element in solid solution, substantially as described.

7. The process of forming a hard infusible product consisting in incorporating with a fusible phenol resin formaldehyde of a quantity just sufficient to combine with nearly all of the same, together with a water combining element and a final product solvent element, and heating the mass sufficiently to cause the reaction to ensue and the mass to be transformed into a hard infusible chemically inert product, substantially as described.

8. The process of forming a hard infusible product consisting in incorporating with a fusible phenol resin a polymerized formaldehyde just sufficient in amount to react with substantially all of the same, together with a final product solvent element, and heating the mass sufficiently to cause the reaction to ensue and the mass to be transformed into a hard infusible chemically inert product, substantially as described.

9. The process of forming a hard infusible product consisting in incorporating with a fusible phenol resin a polymerized formaldehyde just sufficient in amount to combine with substantially all of the same, together with a water combining element and a final product solvent element, and heating the mass sufficiently to cause the reaction to ensue and the mass to be transformed into a hard infusible chemically inert product, substantially as described.

10. The process of forming a hard infusible product consisting in incorporating with a fusible phenol resin from 5 to 7½ per cent. of a polymerized formaldehyde together with a substance which will unite with water expelled during subsequent heating and a substance which will act as a solvent for the final product, and heating the mass sufficiently to cause the reaction to ensue and the mass to be transformed into a hard infusible chemically inert product, substantially as described.

11. The process of forming a hard infusible product consisting in incorporating with a fusible phenol resin from 5 to 7½ per cent. of a polymerized formaldehyde together with a substance which will dissolve in the final condensation product at the baking temperature, and render the same plastic at such temperature and remain in solid solution in the same, and baking the same at a sufficient temperature for a sufficient time to transform the mass into a hard infusible chemically inert product, substantially as described.

12. The process of forming a hard infusible product consisting in incorporating with a fusible phenol resin from 5 to 7½ per cent. of a polymerized formaldehyde together with an organic anhydrid soluble or miscible with the mass and a final product solvent element, and heating the mass at a sufficient temperature for a sufficient time to transform the mass into a hard infusible chemically inert product, substantially as described.

13. The process of forming a hard infusible product consisting in dehydrating a hard fusible phenol resin, incorporating therewith from 5 to 7½ per cent. of formaldehyde free from water and a final product solvent element, and heating the mass at a sufficient temperature for a sufficient time to transform the mass into a hard infusible chemically inert product, substantially as described.

14. The process of forming a hard infusible product consisting in incorporating with a fusible phenol-formaldehyde condensation product in which the folmaldehyde is not quite sufficient in quantity to completely satisfy the phenol, and which is substantially free from water, an amount of formaldehyde just sufficient to combine with the free phenol and with the fusible condensation product, without any excess of formaldehyde, and an ultimate product solvent element, and heating the mass at a temperature and for a time sufficient to transform the product into a hard infusible chemically inert substance, substantially as described.

This specification signed and witnessed this 22d day of May 1911.

JONAS W. AYLSWORTH.

Witnesses:
 Dyer Smith,
 Anna R. Keehm.